United States Patent [19]

Annapareddy et al.

[11] Patent Number: 5,717,862
[45] Date of Patent: Feb. 10, 1998

[54] METHOD AND SYSTEM FOR MESSAGE STATUS REPORTING IN A MULTI-NODE NETWORK

[75] Inventors: Narasimhareddy L. Annapareddy; James Thomas Brady; Damon W. Finney, all of San Jose; Richard F. Freitas, Morgan Hill; Michael Anthony Ko, San Jose, all of Calif.; Michael James Rayfield, Tucson, Ariz.

[73] Assignee: International Business Machines Corporation, Armonk, N.Y.

[21] Appl. No.: 429,702

[22] Filed: Apr. 27, 1995

[51] Int. Cl.⁶ .................................................. G06F 13/00
[52] U.S. Cl. ................................. 395/200.15; 395/800
[58] Field of Search ................................ 395/200.15, 800, 395/200.01

[56] References Cited

U.S. PATENT DOCUMENTS

| | | | |
|---|---|---|---|
| 4,225,919 | 9/1980 | Kyu et al. | 364/200 |
| 4,845,744 | 7/1989 | DeBenedictis | 379/221 |
| 4,905,233 | 2/1990 | Cain et al. | 370/94.1 |
| 5,088,091 | 2/1992 | Schroeder et al. | 370/94.3 |
| 5,138,615 | 8/1992 | Lamport et al. | 370/94.3 |
| 5,175,854 | 12/1992 | Cheung et al. | 395/650 |
| 5,218,676 | 6/1993 | Ben-Ayed et al. | 395/200 |
| 5,261,059 | 11/1993 | Hedberg et al. | 395/325 |
| 5,287,458 | 2/1994 | Michael et al. | 395/250 |
| 5,293,377 | 3/1994 | Gould | 370/94.1 |
| 5,297,137 | 3/1994 | Ofek et al. | 370/60 |
| 5,404,565 | 4/1995 | Gould et al. | 395/800 |

OTHER PUBLICATIONS

RFC907, "Host Access Protocol Specification", Bolt Berenek and Newman Labs. RFC907, Jul. 84, pp. 1–75.

*Primary Examiner*—Mehmet B. Geckil
*Attorney, Agent, or Firm*—Ohlandt, Greeley, Ruggiero & Perle

[57] ABSTRACT

A multi-nodal data processing system includes a plurality of processing nodes, each node connected to plural other nodes by bidirectional data links. Each node comprises receivers for receiving messages on bidirectional data links and transmitters for transmitting messages on bidirectional data links. Each node records child nodes to which a message was transmitted and is further adapted to transmit a lock-up message received from a child node to a parent node, the lock-up message indicating a successful establishment of a message signal path to a destination node. Each node further is adapted to transmit a link cancel signal to another node to close the link in the event of an unsuccessful message transfer attempt over the link. Each node inhibits transmission of a lock-up signal to a parent node until link cancel signals have been received from all child nodes (other than a node from which a lock-up signal was received). A source node (where a message originates) continues transmission of its message, even before a lock-up signal has been received. The destination node which originates the lock-up message terminates a bidirectional data link by an end-of-session signal when it has received an entire message.

8 Claims, 2 Drawing Sheets

FIG. 3.

| | XMIT | RCV | ACTION / MESSAGE | REASONS |
|---|---|---|---|---|
| ∅ 1 | A | B,D,E | TRANSMITS MESSAGE | |
| ∅ 2 | B | C,E | TRANSMITS MESSAGE | |
| | D | C,F | " " | |
| | E | B,F | " " | |
| ∅ 3 | E | B | LINK CANCEL | - ALREADY BUSY |
| | C | F | TRANSMITS MSG. FROM B | - SELECTS FROM B & D MSGS. |
| | C | D | LINK CANCEL | - ALREADY BUSY WITH B MSG. |
| | F | D | LOCK-UP | - SELECTS FROM E & D MSGS. |
| | F | E | LINK CANCEL | - ALREADY BUSY |
| ∅ 4 | D | | HOLDS LOCK-UP FROM F | - AWAITS RESPONSE FROM C |
| | E | A | LINK CANCEL | - UNSUCCESSFUL TRY |
| | B | | HOLDS LINK CANCEL FROM E | - AWAITS RESPONSE FROM C |
| | F | C | LINK CANCEL | - MSG. ALREADY RECEIVED FROM D |
| | D | A | LOCK-UP | |
| ∅ 5 | C | B | LINK CANCEL | - RECEIVED LINK CANCEL FROM C |
| ∅ 6 | B | A | LINK CANCEL | |
| ∅ 7 | A | D | END OF SESSION | - INDICATES END OF TRANSMISSION |

METHOD AND SYSTEM FOR MESSAGE STATUS REPORTING IN A MULTI-NODE NETWORK

FIELD OF THE INVENTION

This invention relates to multi-node data processing systems and, more particularly, to a multi-node data processing system wherein each node reports to a parent node the status of messages transmitted to child nodes, but only performs the reporting action when all child nodes have reported their message status.

BACKGROUND OF THE INVENTION

Multi-node data processing systems are well known in the prior art and all employ one or another form of data communications between nodes. There are many protocols for control of inter-nodal communications and for assuring successful (or detecting unsuccessful) message routing. Among the many protocols is "wormhole" routing wherein a message is enabled to find its way to a destination via a "path of least resistance". Table-based, multi-path routing is known and involves the broadcast of messages to a plurality of nodes in a wavefront manner, the objective being to enable at least one such message to find its way to a destination node. Deflection routing is also employed to avoid congested nodes and enables rerouting of messages around such congested nodes. Backoff and retry procedures are used in networks to enable unsuccessful message transmission attempts to be retried a limited number of times, with the expectation being that at least one such try will result in a message successfully reaching its destination.

A problem present in all such multi-node systems, especially those using multiple wavefront transmissions of messages, is that when a message is successfully received at a destination node, there still remain a number of message copies traversing through the network that are now "excess". Substantial processing time must be expended to assure that those message copies do not "clog" the system and, further, that they are eliminated in a timely fashion.

The "excess" message copy problem has become more severe as multi-node systems have departed from the symmetrical network form to networks exhibiting substantial asymmetries. For instance, a modern multi-node system preferably has the ability to grow to a higher capacity by addition of one or more nodes, as the customer's needs dictate. If the network is required to retain a level of symmetry, the network must be incremented by plural node increments to assure the symmetry. It is desirable that a customer be able to migrate upwardly the capability of a multi-node network by adding one node at a time, until a desired system capability is reached. This often results in an asymmetric network which may exhibit substantially different path lengths between source and destination nodes. Thus, a source node may transmit a message to a destination node via plural paths, some paths being relatively long compared to other shorter paths. The message will likely arrive at the destination node substantially earlier by a shorter path and will cause transmission by the destination node of a response status message in the "upstream" direction towards the source node. However, duplicate message copies are still present on the longer paths and substantial network time is required to eliminate them.

The patented prior art includes many teachings of message routing and message transmission status reporting between nodes. U.S. Pat. No. 5,293,377 to Gould describes a system wherein bandwidth is stolen from a message transmission to enable insertion of control messages. U.S. Pat. No. 5,218,676 to Ben-Ayed et al. describes a dynamic routing system wherein each message is assigned a weight which corresponds to the number of links of the minimal path from the source node to the destination node. The routing system utilizes the assigned weight to establish message priority and routes the messages accordingly.

U.S. Pat. No. 4,905,233 to Cain et al. monitors transmission characteristics of each of plural transmission paths between nodes to derive a plurality of path metrics representative of the ability of the respective transmission paths to transmit signals. A transmission path is then chosen based upon the best "metric". U.S. Pat. No. 5,297,137 to Ofek et al. describes a routing procedure wherein nodes route a data packet to a destination node without prescribing any specific route for the data packet other than the identity of the destination node. The objective of the routing function at every intermediate node is to try to decrease the distance to the destination node as much as possible.

U.S. patent application Ser. No. 08/197,004 to Gould et al. and assigned to the same assignee as this application, describes a message status reporting system wherein each node accumulates a status message from each of a plurality of child nodes and incorporates each of the status messages into a single status message which is then transmitted to a parent node. The status message is not reported upwardly to the parent node until all child nodes have reported their respective status messages.

In order to assure a high efficiency message transfer rate in a multi-nodal system, it is desirable to commence and continue transmission of a message even before the status of a transmission path is known. In such case, if a successful transmission path is established, the message "gets through" in the shortest possible time. If, for any reason, a successful message transmission is not accomplished, one or more retries can be performed. However, when such a protocol is applied to a multi-nodal system, and assuming successful receipt of a message at a destination node, there is still a high likelihood of the presence of message copies on unsuccessful transmission paths.

Accordingly, it is an object of this invention to provide an improved system and method for assuring elimination of unsuccessfully transmitted message copies from communication pathways in the multi-nodal system.

It is yet another object of this invention to provide an improved method and system for message status reporting which assures that when a source node receives acknowledgement of a successful message receipt by a destination node, that all unsuccessfully transmitted message copies have been eliminated.

It is yet another object of this invention to provide a multi-node data communications system wherein data transmissions are controlled to accommodate clock variations in different nodes.

SUMMARY OF THE INVENTION

A multi-nodal data processing system includes a plurality of processing nodes, each node connected to plural other nodes by bidirectional data links. Each node comprises receivers for receiving messages on bidirectional data links and transmitters for transmitting messages on bidirectional data links. Each node records child nodes to which a message was transmitted and is further adapted to transmit a lock-up message received from a child node to a parent node, the lock-up message indicating a successful establishment of a message signal path to a destination node. Each node further is adapted to transmit a link cancel signal to another node to close the link in the event of an unsuccessful message transfer attempt over the link. Each node inhibits transmission of a lock-up signal to a parent node until link cancel signals have been received from all child nodes (other than a node from which a lock-up signal was received). A source node (where a message originates) continues transmission of its message, even before a lock-up signal has been received. The destination node which originates the lock-up message terminates a bidirectional data link by an end-of-session signal when it has received an entire message.

BRIEF DESCRIPTION OF THE DRAWINGS

FIG. 3 is a chart indicating the message status report procedure of the invention.

DETAILED DESCRIPTION OF THE INVENTION

Figure 1:
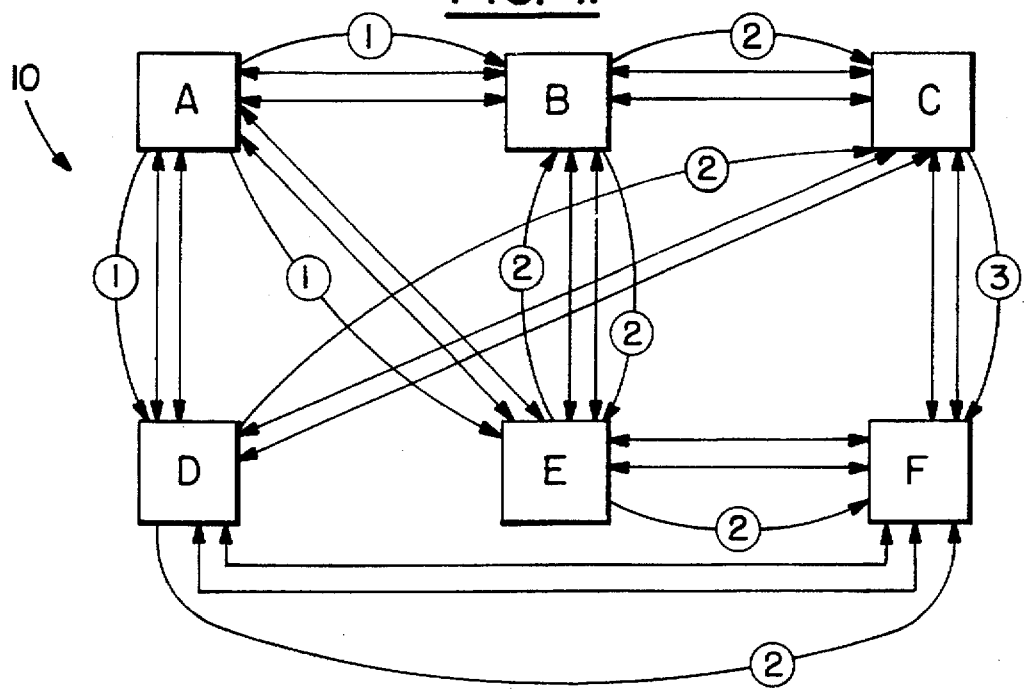
FIG. 1 is a high level block diagram of a multi-node system incorporating the invention.

Referring to FIG. 1, multi-node system 10 comprises, as an example, six independent nodes A, B, C, D, E and F. Each of nodes A–F is connected to at least three other nodes via pairs of bi-directional communication links which handle both command messages and data messages. It is to be noted that multi-node network 10 is asymmetrical and manifests different data path lengths between certain source and destination nodes.

Figure 2:
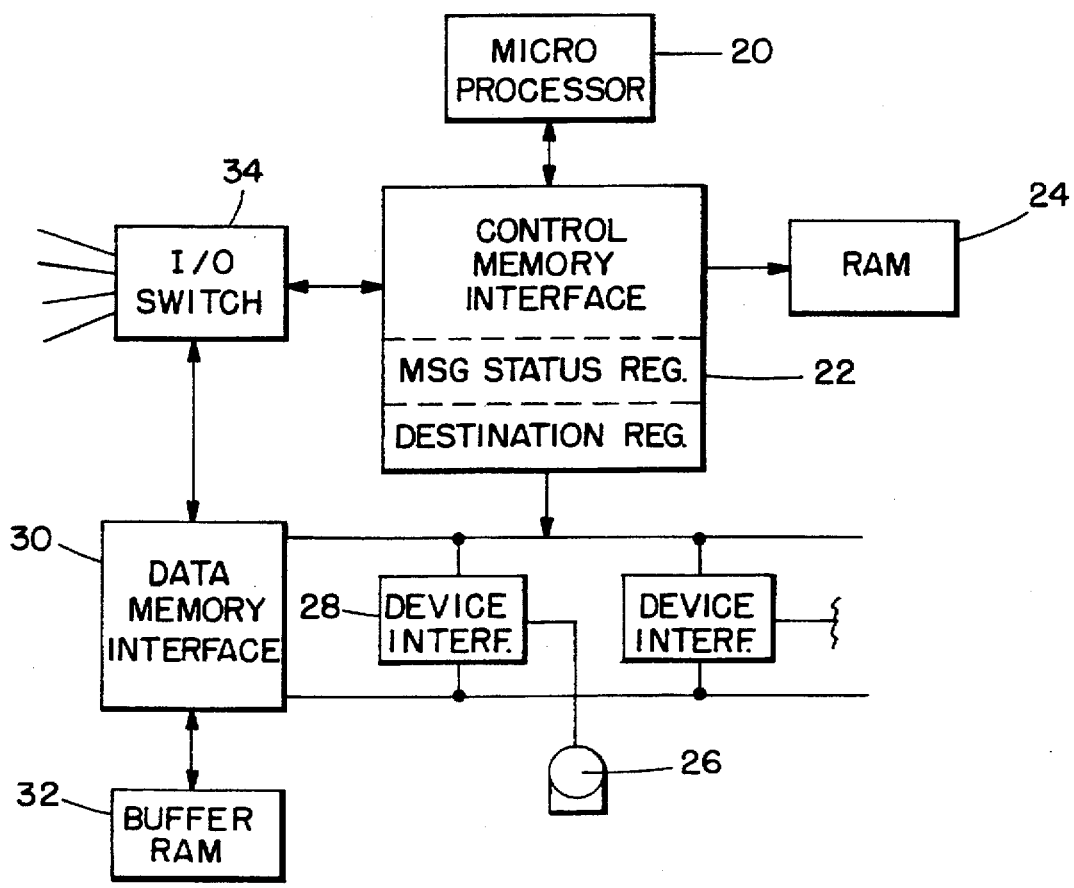
FIG. 2 is a high level block diagram of a node forming a portion of the system of FIG. 1.

Each of nodes A–F in FIG. 1 is configured from a standard node arrangement shown in FIG. 2. A node includes a microprocessor 20 that controls the overall functions of the node. A memory interface module 22 controls communications between microprocessor 20 and plural memory modules within the node. One such memory module is a control memory 22 which contains code that controls the operation of microprocessor 20. Another such memory is a disk drive memory 26 that is connected by an interface module 28 to a data memory interface module 30. A buffer memory 32 is further connected by a buffer interface module 34 to memory interface module 24. Buffer memory 32 provides message buffering functions for both incoming and outgoing data messages. An I/O switch interface 34 provides interface functions for both incoming and outgoing message transfers.

The node of FIG. 2 further includes plural message status registers 36 within control memory interface 22 for containing status messages received from child nodes to which a message was transmitted. A destination register 38 indicates the identity of each of the child nodes to which a message was transmitted. Each node is adapted to compile and transmit a status message indicating the amount of progress that a message has achieved. Each received status message manifests a priority value which is utilized by the node to determine which received status message is transmitted upstream to a parent node.

The message transmission procedure employed by the invention involves simultaneous transmission of copies of a message via plural paths to plural child nodes. Each child node, in turn, transmits identical message copies to a plurality of respectively connected further child nodes, etc., until one such message copy successfully reaches the destination node. As a message proceeds across each link, it may be successfully received by a child node; or the child node may be in a busy state; or may be inoperative; or a message error state may be detected; etc. In each such case, a status message is transmitted by a child node to a parent node evidencing the progress of the message in the child node.

When a destination node receives a message, it transmits a "lock-up" status message to the parent node from which it received the message. The lock-up message is the highest priority message and will always be transmitted by a receiving node, irrespective of other received status messages regarding that particular message. In the event a node receives a message and is in a busy state, or in another state which prevents it from handling or further transmitting the message, it transmits to its parent node a "link-cancel" status message indicating that the link is to be severed and that the transmitted message has been "dumped". Upon receiving a link-cancel message over a link, a parent node immediately knows that the link is again available for a further use and that there is no message copy present thereon.

Only when a parent node receives status messages from all of its child nodes does it transmit the lock-up message to a further upstream node. Thus, when a source node finally receives a lock-up message evidencing a successful message transfer, the source node knows that all child nodes have dumped their duplicate copies of the message and that the respective communication links in the network are prepared for further messages.

To implement the above described protocol, the multi-node system shown in FIG. 1 employs plural "code points" which are, in this example, two byte values that identify either a beginning or an end of a data handling action or embody a specific status message. Control code points are employed to evidence idle states, the start of a transmission; the end of a session; an end of a transmission (normal disconnect); an end of transmission (no further data available to transmit); a beginning of a cyclic redundancy check character, etc. Control messages comprise a link-cancel message; a lock-up message; a disconnect request; a conditional disconnect request; a start of forward data; and a stop of forward data.

Each of the aforesaid control code points is utilized by the network of FIG. 1 to enable control functions to be identified and implemented. Every link transmits a valid data or control code point during every link clock cycle. If there is no data or control code point ready to be transmitted, a node inserts an idle control code point on the link.

Each message includes a routing header, a message header and the data. The start of a message is signaled by a start of transmission control point. At the termination of a message, a source node does not send an end of session or an end of transmission control code point until the source node has received a lock-up control point response from the destination node. This act guarantees that the end of session/transmission control code point is only sent on one path to the destination node, since the receipt of a lock-up code control point guarantees that all unused paths have been torn down and that there are no "stale" messages in the network. After a destination node has safely received an end of session/transmission control point message and returns a status message, the source node responds with a link-cancel control code point to tear down the link connection.

During a routing action, all selected nodes that are not able to establish a connection will return a link-cancel control code point with status information indicating why the link failed to establish a connection. It is only the destination node that returns a lock-up control code point which indicates to the source node (and all intermediate nodes) that a connection has been established. It is to be recognized that the source node continues transmission of a message even before it receives a lock-up control code point. In such manner, the message is not delayed, pending the establishment of the valid transmission path—but rather continues on the assumption that a valid path will be established.

As indicated above, idle control code points are employed at certain times during the operation of the communication system. Each node employs its own clock and there may be a variation in node clock frequencies. In the input/output modules of each node, first in, first out (FIFO) registers are employed to buffer data. If an input FIFO register in a receiving node becomes too full to accept further data—as the result of either nodal processing delays or differences in node clock frequencies, the receiving node issues a stop control code point to the transmitting node which inhibits the transmitting node from sending more forward data. Only when the receiving node issues a start control code point does the transmitting node again commence transmission of data.

Turning to FIG. 3, an example of message transmission in the multi-node system of FIG. 1 will be described. With reference to FIG. 1, it is assumed that node A is the source node and is sending a message to destination node F. During a phase 1 operation, node A transmits identical copies of the message to nodes B, D and E. During phase 2, node B transmits copies of the message to nodes C and E; node D transmits copies of the message to nodes C and F; and node E transmits copies of the message to nodes B and F. Note that two copies of the message have now arrived at destination node F.

During a next phase (phase 3), node E issues a link-cancel control code point to node B, as node E is busy with the message received from node A during phase 1. Node C selects from identical messages received from nodes B and D and transmits the message from node B to node F. Node C, since it is busy with the message from node B received during phase 1, transmits a link-cancel control code point to node D. Node F, the destination node, selects the message received from Node D (from the copies of the messages received from nodes E and D) and transmits a lock-up control code point to node D. Node F further transmits a link-cancel control code point to node E as it is busy with the message received from node D. As above indicated, the link-cancel messages indicate that a copy of the message will be discarded and that the link will be torn down.

During phase 4, node D has received the lock-up message from node F but has not yet received a response from node C. As a result, node D holds the lock-up message. Node E transmits a link-cancel message to node A, indicating that it unsuccessfully tried to contact node F. Node B holds the link-cancel message from node E, as it still has not yet received a response from node C. Node F transmits a link-cancel control code point to node C as an identical message was already received from node D. Node D having received the lock-up message from node F and the link-cancel control code point message from node C, transmits the lock-up message (highest priority) to node A, indicating the message's successful arrival at node F.

During phase 5, node C sends link-cancel control code points to node B indicating that the message received from node B was not successfully transmitted. During phase 6, node B having received the link-cancel message from node C, transmits a link-cancel control code point to node A.

Note that during this entire time, node A has continued to transmit its message over the data links, based upon the assumption of a successful message transmission. During phase 7, node A transmits to node D an end-of-session control code point which indicates the end of transmission for the particular message. Node D then transmits the end-of-session control code point to node F and the message is terminated.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of message communication between nodes in a multi-node parallel processing computing system, each node in the system connected to a plurality of other nodes via bidirectional communication links, said method for transmitting multiple copies of the message from a source node to a destination node, said method comprising the steps of:

(a) transmitting copies of a message from said source node in a downstream direction towards said destination node and to a plurality of first child nodes;

(b) (i) attempting further transmissions of said copies of said message in said downstream direction from each node receiving a message copy to a plurality of subsidiary nodes;

(ii) transmitting a link cancel message to a parent node upon an unsuccessful message transfer attempt, said link cancel message indicating availability of the link for further message transmissions;

c) repeating step (b) so that said copies of said message are attempted to be transmitted from each child node in said downstream direction to plural further child nodes coupled thereto, at least until one copy of said message reaches said destination node or no copy of said message is able to reach said destination node;

d) upon said destination node receiving a copy of said message, causing said destination node to report a lock-up message to a parent node from which said copy of said message was received; and e) upon said parent node receiving said lock-up message and link-cancel messages from any other nodes to which said parent node transmitted copies of said message, reporting said lock-up message to a next upstream parent node.

2. The method as recited in claim 1, wherein said transmitting step continues independent of a lack of receipt of a lock-up message.

3. The method as recited in claim 1, wherein each node that issues a link-cancel message further causes said node to destroy its copy of said message.

4. The method as recited in claim 1, wherein step (e) is repeated until said lock-up message is received by said source node.

5. In a multi-nodal data processing system, a plurality of processing nodes, each processing node connected to plural other processing nodes by bidirectional communication links, each node comprising:

a) receiving means for receiving messages on a bidirectional communications link;

b) transmitting means for transmitting messages on said bidirectional communications link;

c) means for recording to which child nodes a message is transmitted by said transmitting means;

d) means for transmitting a link-cancel signal to a parent node to indicate a de-allocation of a communication link as a result of an unsuccessful message transfer attempt; and e) means for causing said transmitting means to transmit a lock-up message, received from a child node, to a parent node, said lock-up message indicating a successful establishment of a message communication path to a destination node, said means e) inhibiting transmission of said lock-up message until link-cancel messages are received from all other child nodes to which copies of said message were transmitted by said node.

6. The node as recited in claim 5 wherein said node determines which status message to transmit to a parent node in accordance with an assigned priority to each status message, a lock-up message having higher priority than a link cancel message.

7. The node as recited in claim 5 wherein said receiving means comprises a first-in first-out memory for receiving message data, said receiving means further including means for determining when said first-in first-to out memory is unable to receive further data and for causing said transmitting means to transmit a control message to a parent node requiring a cessation of message transmission therefrom.

8. The node as recited in claim 5 wherein said node further includes means for destroying said message copy upon a transmission link-cancel message.

* * * * *